(Model.)
P. SEIBEL.
BOTTLE FILLER.
No. 248,672.　　　　　　　　　　Patented Oct. 25, 1881.
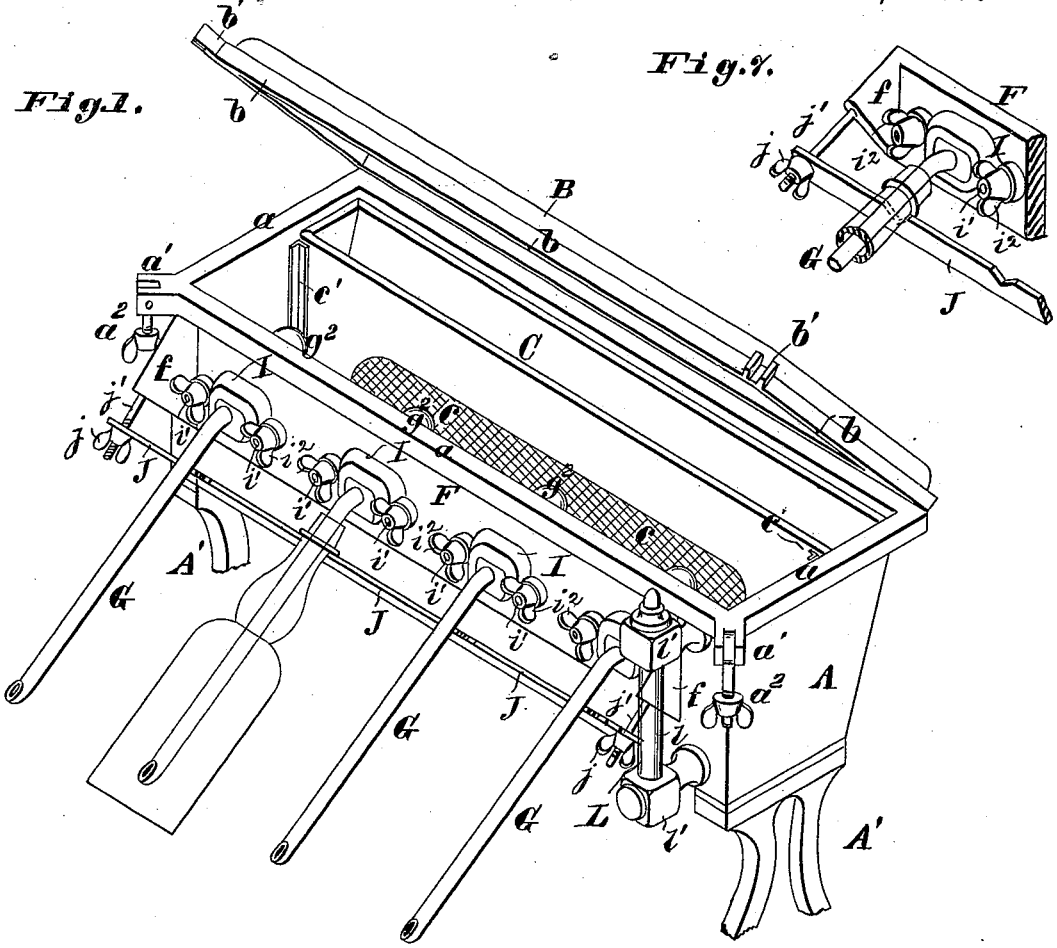
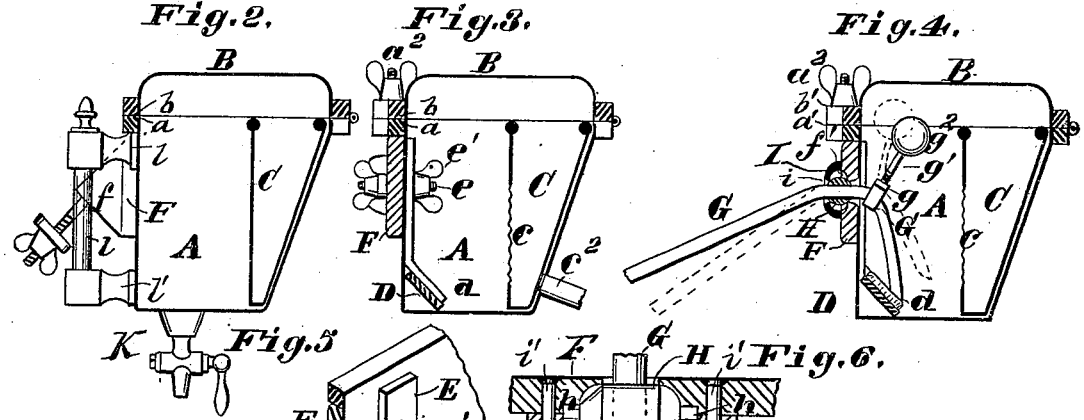
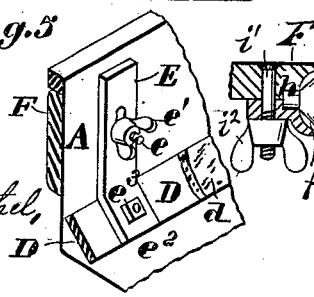
Attest,
Charles Pickles
John W. Herthel
Inventor.
Phillip Seibel
per Herthel & Co
Att'ys

UNITED STATES PATENT OFFICE.

PHILLIP SEIBEL, OF ST. LOUIS, MISSOURI.

BOTTLE-FILLER.

SPECIFICATION forming part of Letters Patent No. 248,672, dated October 25, 1881.

Application filed March 29, 1881. (Model.)

*To all whom it may concern:*

Be it known that I, PHILLIP SEIBEL, of St. Louis, in the State of Missouri, have invented a new and useful Bottle-Filler, of which the following is a specification.

My invention relates to improvements in an apparatus for filling bottles with liquid of any kind.

I will first fully describe the construction and operation of my said improvements and hereinafter point out the novel features thereof in the claims.

Of the drawings, Figure 1 is a perspective view of the entire apparatus, the cover being open to show the inside trough with its strainers. Said figure also shows a bottle placed on the bottle-rest and hung on the siphon ready to be filled. Figs. 2, 3, and 4 are respective transverse sectional elevations of the apparatus with its cover closed. The section of Fig. 2 is taken near the right-hand corner of Fig. 1, facing the gage. The section Fig. 3 is chiefly to show the brace and screw to fasten the frame outside and the corner-seat inside of the main trough, and the section Fig. 4 is taken on a line with one of the siphons. Fig. 5 is an enlarged perspective detail, showing inside corner of main trough with its strap or brace to secure the seat, also outside frame, also to show the packing on the seat. Fig. 6 is an enlarged plan section of part of the outside frame carrying the journal-plates, also showing the manner of journaling the siphons. Fig. 7 is an enlarged detail perspective of one of the front corners of the apparatus to show its bottle-rest.

Similar letters refer to similar parts throughout the several views.

A is the main trough or receptacle supported on legs or standards A′ A′. The trough A is preferably of the rectangular shape, with wider top than bottom, as shown.

B is the lid or cover fitted to close the open top of the main trough, as follows: The entire top two contiguous faces, *a b*, of both the trough A and its cover B are made flush, smooth, or even, so that when the cover closes top of the trough a closed joint is had sufficient to prevent inlet of air to cause foaming of the liquid contained in the trough, also prevent impurities from entering between said bearing-faces *a b*. The rear part of the cover can be hinged to the rear of the main trough in any suitable manner. *a′ a′*, the front corners of the main trough, likewise *b′ b′*, the front corners of the cover, are made alike, each consisting of the angular projections with open slot, as clearly shown in Fig. 1.

$a^2 a^2$ are thumb screws and stems. The latter are journaled, respectively, in the corner-projections *a′ a′*. (See Figs. 1, 3, 4.) The main purpose of the thumb-screws with stems and the slotted angular projections in both main trough and cover is to secure the said cover rigid to its place top of and to close the main trough. When the cover is turned down or closed its front projecting slotted corners come in line with those of the main trough. The thumb-screws by their stems are then made to engage the open slotted corners of the cover. This done, the thumb screw or nut is screwed down upon the cover, and the latter is thus held secure and firm. (See Figs. 3, 4.) As apparent, the rear corners of the cover and main trough can be secured together by the like means and in like manner just described as the front corners of said parts, in which case the hinges can be dispensed with.

C is the inside trough for purposes of first receiving the inflow of the liquid and straining same before its passage into the main trough. Also, said trough C collects the deposits or impurities that may be in the liquid; and as said trough can be easily taken out from and replaced in the apparatus, the latter can the better be kept clean and in effective condition for operation. The trough C has the openings in its front face covered with strainers *c c*. (See Figs. 1, 3, 4.) It is through the strainers that the liquid flows. Thus the purer liquid passes into the main trough, and from which the bottles are filled.

*c′ c′* are corner-strips secured inside of main trough, to retain in place the inside trough; hence, also, this can be lifted out of or replaced inside the main trough.

$c^2$ is the inlet-pipe connection, communicating from the outside to the interior of the inside trough, C. (See Fig. 3.) To this inlet $c^2$ the hose or pipe connection is made to fill the apparatus with the liquid.

D is a corner-seat. (See Figs. 3, 4, 5.) This seat D consists of a bar or plate extending the entire length of the main trough and arranged inside to straddle the bottom corner of same and present the inclined seat or face, as shown in Figs. 3, 4, 5. In line with the system of siphon-tubes the corner-seat D has packing $d$, for the purpose of shutting off the flow of the liquid through the siphons when the inner end of same is made to close against or is held down upon said packing $d$, and as will hereinafter appear.

E are two straps to hold rigid in place not only the corner-seat D, but at same time the front frame, F, to the front face of the apparatus.

The frame F is a separate face-plate extending the entire length and placed alongside of the outer or front face of main trough. The opposite ends of the frame F have the triangular projecting corners $f f$ to form a support for the bottle-rest, as will hereinafter appear. The frame F has oval shaped openings $f'$, large enough to receive and form a bearing for one-half of the cylinder-shaped journal of the siphons. (See Figs. 4 and 6.) The siphons proper are inserted through the openings $f'$; likewise pass through suitable openings made in the front vertical face of main trough. (See Fig. 4.) The said openings are, further, large enough to accommodate the slight vertical oscillation of the siphons, as indicated in Fig. 4; also, to permit each siphon to be readily removed or replaced for repairs or cleansing, &c.

As stated, the frame F is secured rigid alongside of the front of the apparatus by two of the straps E, which are placed inside of main trough, near the corners thereof. For this purpose the frame F has two pins, $e$, which project inside, (passing through the front face of the apparatus.) The straps or braces E, by their slots, engage the pins $e$, and by screwing on the latter a nut, $e'$, said straps are tightened against the inside face of the trough, and at same time brace and firmly secure the frame F. Thus secured the frame F not only serves as a support for the siphons and their journals, but also strengthens the apparatus to support the weight of the filled bottles hanging on the siphons and the bottle-rest. The lower end of the straps E are bent to fit over the top face of the corner-seat D, and by nut $e^3$, screwed on a threaded pin projecting from said corner seat, the latter is at same time held secure to its place. (See Fig. 5.)

G represents the siphons, having their bent or short arm inside of main trough, while the long arm projects outside, in the manner clearly shown in Figs. 1, 4, 6, and 7. At $g$ each siphon has a screw-socket, in which the threaded end of a stem, $g'$, can be screwed or unscrewed. Said stem carries a ball-weight, $g^2$, clearly shown in Figs. 1, 4. The weight of the ball so attached to the short arm of the siphon overbalances the long arm thereof, hence causes the siphon by its lower end of short arm to drop upon the packing $d$ of the corner-seat D. In Fig. 4 the full lines represent the gravity of the weight as having so tilted the siphon that the end of its short arm is kept closed by pressure upon the packed seat D. Thus the communication or passage of the liquid through the siphon is automatically prevented. The dotted lines represent the position of the siphon in open communication to permit the flow of the liquid, the inner end of siphon being kept lifted away from the packed seat D. It can be here stated that it is the weight of the bottle when hung on the long arm of the siphon which overcomes the gravity of the ball-weight and establishes the said open communication between the liquid and the siphon. That the siphons can oscillate as required, each is journaled to the frame F as follows: To each siphon is secured a ball or cylinder shaped journal, H, the opposite sides or ends of which have the projections $h$, which engage corresponding bearings existing alongside of the openings $f'$ in the frame F. (See Figs. 4 and 6.)

I represents the respective journal-plates, to retain the journals of the siphons in their bearings, at same time to cover as much as possible the remaining part of the openings $f'$, so as to prevent impurities, &c., entering the main trough. The journal-plates I are shaped to cap or cover the projecting part of the journals H. (Clearly shown in Figs. 1, 4, 6, 7.) At $i$ is an opening in each journal-plate for the siphon to pass through, while the opposite ends of journal-plate have proper openings to place and secure it against the frame F. (See Figs. 1, 4, 6, 7.) This latter is done by placing the journal-plate in place to cover the journal of the siphon, the ends of the journal-plates engaging the respective pins $i'$ projecting from the frame F, and, lastly, screwing on said pins the nuts or thumb-screws $i^2$. (See Figs. 1, 4, 6, 7.) The front opening, $i$, in the journal-plate need only be large enough to accommodate the oscillation on part of the siphon. It is plain that by unscrewing the nuts $i^2$ the journal-plates can be removed in case the siphons are to be taken out. This is done by unscrewing the ball-weight and stem from the socket of the siphon, then partially turning it so that the length of its socket $g$ is brought in line with the length of the openings $f'$. The siphon is thus readily removed, and in like manner replaced.

J is the shoulder-plate, and in conjunction with set-screws $j$, stems $j'$, and the projecting corners $f f$ of frame F, constitutes the bottle-rest. The shoulder-plate J has V-shaped notches, as best adapted to suit the different sizes of the shoulders of bottles, and form a bearing for same when the bottle is placed on the siphon, as clearly shown in Figs. 1 and 7. The plate J is adjustably secured by the set-screws $j$, stem $j'$ to the corners $f f$ of the frame F—that is, said shoulder-plate can be brought nearer to or farther away from the front of the apparatus for the purposes of suiting the operator in filling the bottles. As shown in Figs.

1 and 7, the shoulder-plate J is arranged to have the inclination suited to the position the bottle assumes when placed on the siphon.

K is the waste-cock for emptying the main trough. (See Fig. 2.)

At one corner, to the front of the apparatus, L indicates a gage to determine the height of the liquid inside the apparatus when it is closed. This gage consists of a vertical glass tube, $l$, jointed to the respective upper and lower pipe-couplings, $l'$, each of which communicates with the inside of main trough. (See Figs. 1 and 2.)

The operation of the apparatus and manner of filling the bottles are as follows: The beer, wine, or other liquid is permitted to flow into the main trough, first having passed through the wire-gauze strainers of the inside trough. The liquid is allowed to fill the main trough nearly to the level of the bend of the siphons, (the gage indicating the height.) The gravity of the ball-weight has kept the siphons closed. The bottles are next inserted on the siphons in respective order, each bottle resting by its shoulder in the V-notch of the shoulder-plate J. (See Figs. 1 and 7.) In placing each bottle on its siphon the latter is tilted to open the siphon and permit the liquid to flow and fill the bottle. By the time the last bottle is placed on its siphon the first bottle is properly filled and ready for removal. As soon as the first filled bottle is removed and replaced by a fresh bottle the second bottle is already filled ready for removal, and is replaced by a fresh one, and so on in proper order, the capacity of the apparatus here presented being adapted for four bottles. The filling of the bottles is here achieved with the greatest dispatch and certainty, effecting a great saving in time, labor, and expense. The apparatus can always be kept clean, its several parts repaired as may be necessary, and otherwise be kept in proper condition.

What I claim is—

1. In combination with the trough A, having smooth bearing-faces $a$ and the angular projecting corners $a'$, with pivoted stem and set-screws, the cover B, having the like bearing-faces and angular projecting corners $b'$, as and for the purposes set forth.

2. In combination with the main trough A, the frame F, having projecting corners $f f$, the stems and nuts $j j'$, the shoulder-plate J, having V-notches, by means whereof said plate can be adjusted and form the bottle-rest, substantially as described.

3. In combination with the main trough A, the frame F, having openings $f'$, the siphon G, having journal H, the journal-plates I, having opening $i$, the stems and nuts $i'$ $i^2$, by means whereof said siphons can be oscillated in the manner and for the purposes set forth.

4. In combination with main trough A, the journaled siphons G, having screw-socket and stem and ball-weight, the corner-seat D, having packing $d$, by means whereof the automatic closure of the open end of the short arm of the siphon is had in the manner and for the purposes set forth.

5. In combination with the trough A, having the corner-seat D, the frame F, having pins $e$, the brace or strap E, and fastening-nuts, by means whereof said corner-seat and frame are held rigid to their places, as and for the purposes set forth.

6. In combination with the frame F, having pins $i'$, the journal-plates I, having openings $i$, the fastening-screws $i^2$, and the journal H of siphon G, as and for the purposes set forth.

7. The combination of main trough A, the corner-seat D, having packing $d$, the frame F, having pins $e$ and $i'$, the braces E, the fastening-screws $e'$ $e^3$ $i^2$, the siphons G, carrying ball-weight $g^2$, and having journal H, the journal-plates I, all said parts constructed and arranged to operate in the manner and for the purposes set forth.

8. In an apparatus for filling bottles with liquid, the combination consisting, essentially, of troughs A and C, the former closed at top by cover B, the latter having strainers, the inlet-pipe $c^2$, the journaled siphons G, carrying ball-weight, the frame F, having openings $f'$, the braces E, the corner-seat D, having packing $d$, the journal-plates I, and the gage L, all said parts constructed to operate as described.

In testimony of said invention I have hereunto set my hand.

PHILLIP SEIBEL.

Witnesses:
WILLIAM W. HERTHEL,
CHARLES PICKLES.